United States Patent [19]

Peppel et al.

[11] Patent Number: 4,760,992
[45] Date of Patent: Aug. 2, 1988

[54] ROPE TENSION DAMPER

[75] Inventors: George W. Peppel, Arlington; Paul E. Sullivan, Bedford, both of Tex.

[73] Assignee: Lockheed Corporation, Calabasas, Calif.

[21] Appl. No.: 22,835

[22] Filed: Mar. 6, 1987

Related U.S. Application Data

[60] Continuation of Ser. No. 798,124, Jan. 6, 1986, abandoned, which is a division of Ser. No. 620,433, Jun. 14, 1984, which is a continuation-in-part of Ser. No. 373,456, Apr. 30, 1982, abandoned.

[51] Int. Cl.$^4$ .............................................. B65H 59/26
[52] U.S. Cl. .................. 254/277; 242/155 R; 254/392; 254/394
[58] Field of Search ............... 254/277, 264, 392, 396, 254/398, 417, 394, 900; 242/75.3, 107, 155 R; 24/71.1, 71.2; 114/230, 243, 247, 253, 254; 267/57.1 R, 57.1 A, 140.4, 141.1, 153, 154; 474/134, 135

[56] References Cited

U.S. PATENT DOCUMENTS

| | | | |
|---|---|---|---|
| Re. 30,842 | 1/1982 | Speer | 474/135 |
| 171,354 | 12/1875 | Cooley | 474/134 |
| 959,667 | 5/1910 | White | 474/134 |
| 2,087,253 | 7/1937 | Herold | 248/575 X |
| 3,043,566 | 7/1962 | Grise | 254/277 X |
| 3,481,584 | 12/1969 | Conry et al. | 254/900 X |
| 3,511,492 | 5/1970 | Galbato | 267/57.1 R X |
| 3,777,672 | 12/1973 | Schneider | 267/57.1 R X |
| 3,817,113 | 6/1974 | Pfarrwaller | 474/135 |
| 4,108,508 | 8/1978 | Clinard | 267/57.1 R X |
| 4,349,184 | 9/1982 | Peterson et al. | 267/140.4 X |

Primary Examiner—Stuart S. Levy
Assistant Examiner—Joseph J. Hail, III
Attorney, Agent, or Firm—Eric R. Katz

[57] ABSTRACT

A novel rope tension damper device is adapted to be installed, for example, at a location between a winch and the fairlead that guides the rope. The device comprises a co-planar pair of sheaves respectively mounted at opposite ends of a rotatable arm. The two sheaves are oriented with their respective rotational axes parallel to the rotational axis of the arm such that with the rope entering the device tangential to a point on the periphery of the first sheave and exiting the device tangential to a second point on the periphery of the second sheave, and with the arm's longitudinal axis more or less perpendicular to the orientation of the rope as it enters and exits from the device prior to the application of any tension, the rope within the device will be guided by the two sheaves into a generally S-shaped configuration which will be gradually distorted into a relatively straight configuration as the tension in the rope applies a torque couple to the arm and thereby causes it to rotate to an orientation more parallel to that of the rope outside the device. Preferably, a pair of such elastomeric torsional members are provided, one on either side of the rotatable arm and concentric with its rotational axis. Shearing forces within the elastomer serve to generate a counter-torque on the rotating inner arm, thereby causing a variable damping force to be applied to the rope as the arm and sheave assembly is rotated from its zero load position.

5 Claims, 6 Drawing Sheets

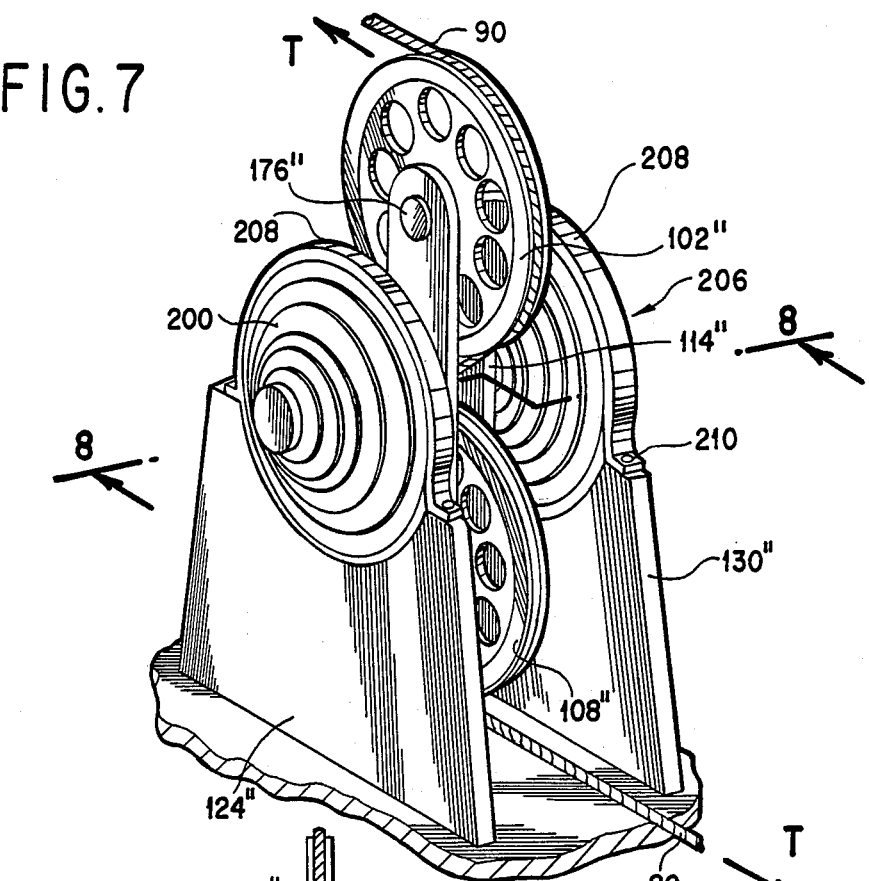

ROPE TENSION DAMPER

CROSS REFERENCE TO RELATED APPLICATIONS

This is a continuation of co-pending application Ser. No. 798,124 filed on Jan. 6, 1986, now abandoned, which is a divisional application of pending prior application Ser. No. 620,433, filed on June 14, 1984, which in turn is a continuation-in-part of Ser. No. 373,456 filed Apr. 30, 1982, now abandoned.

TECHNICAL FIELD

The present invention relates generally to nautical fittings and more particularly to a tension damper device that may be used to absorb the sudden changes in tensile forces to which a wire rope or other flexible line securing a vessel to its mooring is subjected as the vessel moves relative to the mooring.

BACKGROUND ART

When a boat or other vessel is moored to a pier or other mooring by means of a wire rope or other flexible but relatively inelastic line, it is conventional to provide the line with some type of device for maintaining the line taut while allowing a predetermined amount of resilient elongation in order to allow relative movement between the vessel and its mooring.

U.S. Pat. No. 4,022,450, entitled "Line Tensioning Device," is representative of one such prior art device which utilizes a pair of tension springs to maintain a resilient Z-shaped bend in the line that stretches into a more elongated shape when a predetermined tensile force is applied to the line.

U.S. Pat. Nos. 546,788 and 869,130, respectively, entitled "Cable Buffer" and "Yielding Boat Cleat", disclose prior art mechanical devices in which one or more coil springs are compressed as excessive tensions or strains are applied to the hawser, cable or rope.

U.S. Pat. Nos. 143,993 and 107,917, respectively entitled "Windlasses" and "Improvements in Surge-Relievers" disclose other devices in which shocks in the cable caused by the movement of the vessel are absorbed by a plurality of rubber springs.

It will be noted that the above-described prior art tension absorbing devices utilize spring elements which are compressed or elongated in a linear direction and accordingly there is an approximately linear relationship between the stress applied to the rope and the resultant increase in its effective length.

U.S. Pat. No. 4,273,066, entitled "Oil Storage Vessel, Mooring Apparatus and Oil Delivery for the Off-Shore Production of Oil," proposes various apparatus for mooring a vessel at sea to a deep water submerged mooring which includes both a mooring line (which depending upon the particular application may be either a floating rope or a heavy chain) and a flexible length of oil transfer hose. The Patent makes mention of a manually or automatically controlled tension releasing (self-rendering) mooring winch, and a mechanical damping device (a damping roller) at columns 5 and 8. Column 15 of the Patent describes a mechanism called "The Damper" which is said to be designed and adjusted to absorb a portion of the shock cyclical loadings placed on the mooring line. The Damper is described as comprising a concave roller with butt ends over which the mooring line will pass, the roller being held at a specific height above and astern of the wire rope winch by two arms which pivot about an axis, the arms in turn being held in position by springs or hydraulically controlled arms. This same Patent also discusses the use of a mooring line to effect a resilient connection between a floating storage vessel and a service tanker with the required tension being provided by placing the propeller on the service tanker in its reverse power position to provide a predetermined amount of tension on the line and the oil hose is arranged in such a way that a relative motion between the vessels of up to a 150 feet (about 45 meters) may be accommodated (column 12).

Mechanical tensioners have also been employed to maintain a more or less constant tension in endless drive belts such as are utilized to drive the various accessory subsystems associated with a modern automotive engine. Such belt tensioner devices are intended to compensate for the changes in the belt's length during its service lifetime while ensuring that a proper amount of tension is maintained in the belt to eliminate any slipping between the belt and the various pulleys around which it travels and at the same time without exerting an excessive tension force on the belt.

U.S. Pat. No. 4,285,676 and U.S. Pat. No. Re. 30,842, entitled respectively "Mechanical Belt Tensioner Construction" and "Tensioning Apparatus," disclose typical prior art endless drive belt tensioners wherein a torsional spring is provided at one end of a lever arm for pivotally moving an idle pulley at the other end of the lever arm in a direction generally perpendicular to the belt's longitudinal orientation as it extends between adjacent fixed pulleys to thus compensate for changes in the belt's length by increasing the effective distance between the fixed pulleys. The torsional spring may comprise a plurality of coil springs (such as is shown in U.S. Pat. No. 4,285,676) or, alternatively, may be a hollow cylinder of elastomer material which exerts the required rotational force as the result of the elastomer being subjected to a torsional shear (such as is shown in U.S. Pat. No. Re. 30,842).

U.S. Pat. No. 3,817,113, entitled "Chain Drive with Idler Wheel Tensioning Means Biased by Elongated Pads," is particularly related to a chain drive for textile machines which may have to be abruptly stopped and restarted such that the chain thereby experiences considerable strain. A torsion effect results as a plurality of rubber pads are distorted in cross section as the tension device is rotated.

It will be appreciated that dampers that have been adapted for use with continuous belt chains and other similar drive systems will never be required to handle the particularly large forces and constant pounding that are associated with many nautical applications. Accordingly, the reactive force resulting from the application of an unbalanced torque (rather than a balanced torque couple) will probably not materially affect the reliability of such device when used for their intended application.

U.S. Pat. No. 2,087,253, entitled "Tilting Mechanism Especially for Chairs," illustrates the use of a cylindrical body of rubber that is highly compressed and confined between concentric tubular members so as to in effect be bonded to their surfaces such that relative rotary movement between the tubular members puts the rubber body under torsional strain. An adjusting mechanism is provided to vary the torsional strain imposed upon the rubber and thus the force required to tilt the seat of a chair supported by such a resilient rubber arrangement. Such a form of construction is believed to be exemplary of a number of different applications in which a cylindrical rubber bushing is utilized to accommodate a limited rotational movement between adjacent structural elements, while at the same time biasing the mechanism to its normal position. It should be noted that such a biasing, although cylindrical in shape, does not employ what is hereinafter referred to as "longitudinal torsional shear" and that furthermore the "radiating" torsional shear within the rubber is concentrated in its hub portion, rather than being distributed uniformly.

DISCLOSURE OF THE INVENTION

A novel rope tension damper device is adapted to be installed at an intermediate position along the length of a wire rope or other similar flexible line. For example, the tension device may be attached to the deck of a ship at a location between the winch that controls the effective length of the rope and the fairlead that guides the rope so that it does not snag or tangle as it is wound and unwound from the winch. Alternatively, the device may be installed in the vicinity of a fixed end of the rope preferably between a fairlead and the cleat to which the rope is attached. Additionally, the device also includes means for horizontally stabilizing the torsion spring against sag and the attending loss of ability to withstand torsion stress.

The actual device comprises a co-planar pair of sheaves respectively mounted at opposite ends of a rotatable arm. The two sheaves are oriented with their respective rotational axes parallel to the rotational axis of the arm such that with the rope entering the device tangential to a point on the periphery of the first sheave and exiting from the device tangential to a second point on the periphery of the second sheave, and with the arm's longitudinal axis more or less perpendicular to the orientation of the rope as it enters and exits from the device prior to the application of any tension, the rope within the device will be guided by the two sheaves into a generally S-shaped configuration which will be gradually distorted into a relatively straight configuration as the tension in the rope applies a torque couple to the arm and thereby causes it to rotate to an orientation more parallel to that of the rope outside the device. Elastomeric torsion springs connect the rotatable inner arm to an outer fixed frame, with shearing forces within the elastomer serving to generate a counter-torque on the rotating inner arm, thereby causing a variable damping force to be applied to the rope as the arm and sheave assembly is rotated from its zero load position. Conically shaped reinforcing plates sandwiched between sections of elastomer which are compressed against the reinforcing plates provide rigidity and prevent the spring from sagging.

In accordance with a preferred embodiment of the invention, the elastomeric torsion spring has the configuration of a pair of torsion springs. Since each of the springs need accommodate only a portion of the rotation of the arm relative to the outer frame, the corresponding length of each of the cylinders will be shorter for a given maximum shear angle within the elastomer, thereby permitting a more compact design to be constructed for a given set of operational parameters.

Preferably, a pair of such elastomeric torsional members having a laminar construction are provided, one on either side of the rotatable arm and concentric with its rotational axis. In the preferred configuration elastomeric components are laminated upon conically shaped reinforcing plates and compressive force is provided along the center line of the torsional members to prevent sag of the torsional members and sheaves under dead weight. Additionally, the compression of the elastomeric members along their center lines increases elastomer life under dynamic conditions and restricts axial movement in the elastomeric springs which might result from side forces imparted by the rope if it does not come off the sheaves straight.

In accordance with other embodiments of the invention, the elastomeric member may be configured either as an elongated cylinder with one end of the cylinder attached to the rotatable member and the other end of the cylinder attached to the fixed member or as a disk having a hub portion attached to one of the members and its rim attached to the other of the members.

As a result of the design geometry, as an increase in tension in the rope rotates the arm and elongates the S-shaped bend, a correspondingly lesser leverage is associated with the torque couple applied to the arm by the tension in the rope. Since the elastomer provides a counter-torque approximately proportional to the angular displacement of the arm, the device will always maintain at least a slight bend in the cable and thus be able to absorb further momentary increases in the tension applied to the cable. Furthermore, by appropriate initial adjustment of the orientation of the rotatable arm under zero tension load conditions relative to the orientation of the rope as it enters and exits the device, it is possible to vary the operational characteristics of the device and in particular the rate at which the effective length of the rope changes with respect to a predetermined increment of tension.

BRIEF DESCRIPTION OF THE DRAWINGS

FIG. 7 is an isometric view of a third embodiment of a rope tension damper device;

FIG. 8 is a side elevational view partially in cross section of the embodiment of FIG. 7;

PRESENTLY PREFERRED EMBODIMENTS FOR CARRYING OUT THE INVENTION

Figure 1:
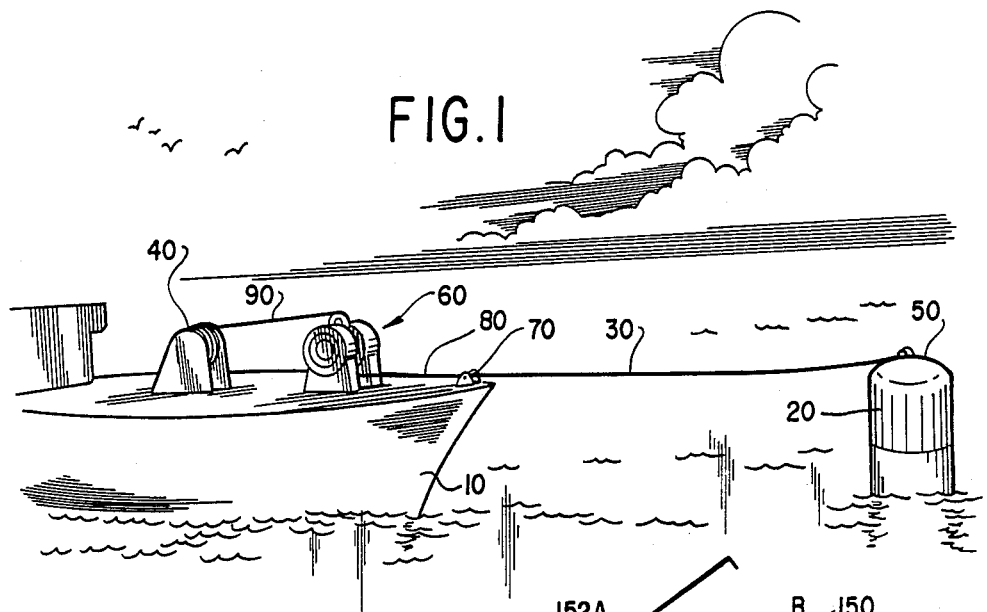
FIG. 1 is a diagramatic representation of a rope tension damper device in accordance with the present invention in use aboard a ship to absorb sudden changes in tension in the rope used to attach the ship to a mooring buoy.

Reference should now be made to the drawings, and in particular to FIG. 1 thereof, which it will be recalled is a diagrammatic representation of a device in accordance with the present invention used to absorb changes in tension in a ship's mooring rope. It will be seen that the ship (10) is secured to a mooring buoy (20) by means of a mooring rope (30). Typically, the mooring rope (30) will be a twisted cable of steel strands having an overall diameter of approximately 5 centimeters and will be capable of withstanding a considerable tensile force but may also be any other suitable type of rope or a chain. The cable (30) thus will normally be more than adequate to secure a relatively large vessel (for example, a 100 ton oil tanker) relative to its mooring (20). However, in high seas, the action of the waves will cause the vessel (10) to pitch and roll, which in turn will result in relative movement between the vessel (10) and its mooring (20). Accordingly, as the vessel (10) moves towards its mooring, there will be a tendency for slack to develop in the mooring rope (30). Conversely, as the vessel (10) moves away from the mooring (20), any slack in the cable (30) will be taken up and unless appropriate means is provided to prevent the buildup of excess tension, the cable (30) will have to withstand a sudden potentially large force impulse as the momentum of the vessel (10) is transferred to its mooring (20) through the now taut rope (30). To some extent, the effects of such an increase in the tension to which the rope (30) is subjected may be avoided by means of prior art spring-loaded shock absorber devices such as have been described above; furthermore, the winch (40) may be designed and operated so as to offer only a limited resistance to increases in the tension within the cable (30) before it automatically allows the cable to unwind. However, it should be appreciated that such expedients are operable only within a limited range of operational parameters and there still remains a need for an appropriate device that will reliably dampen and absorb the effects of increases in the rope's tension before the tension forces have built up to the point where they may equal or exceed the tensile strength of the rope or of its termination.

As shown in FIG. 1, the vessel's mooring is a buoy (20) which also is subject to the action of the waves. However, the buoy (20) will normally be anchored to the seabed by means of a system of anchors and/or pipes (not shown in the Figure) maintained in tension by the buoyant action of the buoy (20). Although it is possible to minimize the effects of wave action on the buoy (20) by it such that the greater part of its volume is sufficiently deep to be reasonably free from severe wave action, it nonetheless will be appreciated that the buoy (20) also will experience some motion that will be out of phase with the pitching and rolling of the vessel (10) and thus will further add to the relative motion between the vessel (10) and its mooring (20).

A first end of the cable (30) is wound about a winch (40) on the deck of the vessel (10), while the other end of the cable (30) is attached to the buoy (20) by means of a suitable cable attachment (50); the winch (40) thus functions to secure—albeit in an adjustable fashion—the cable (30) relative to the vessel (10). A novel tension device (60) is installed on the vessel (10) such that it is in an intermediate position between the winch (40) and a fairlead (70) which may be provided at the gunnel of the vessel to control the orientation of the exiting portion (80) of the cable (30) relative to the tension device (60). The portion (90) of the cable (30) entering the tension device (60) will normally be at a proper orientation relative both to the winch (40) and to the tension device (60) by virtue of the fact that the cable (30) extends directly from the winch (40) to the tension device (60) and both are commonly mounted on the deck of the ship (10). Furthermore, the entering portion (90) of the cable (30) and the exiting portion (80) are oriented more or less parallel to one another but spaced apart such that as tension is applied to the cable (30) a torque couple will be applied to the tension device (60), the magnitude of which being determined not only by the tension in the rope (30) but also by the vertical displacement of the entering portion (90) relative to the exiting portion (80).

At this point, it should be noted that although particularly adapted for use for securing an oil tanker to a buoy provided at the upper end of a riser leading from an undersea oil well, thereby locating the vessel relative to the mooring buoy while oil is pumped from the well to the tanker by means of a flexible oil line (not shown in FIG. 1), the tension device (60) may also advantageously be used when the vessel is to be attached to fixed moorings such as provided by a pier or a fixed platform mounted on pilings penetrating the ocean floor (for example, in shallower regions such as may be found along the continental shelf), as well as when a first vessel is to be tried to a second vessel (for example, a tugboat to a barge, or a floating storage vessel moored in the vicinity of un undersea well to a service tanker while the service tanker is off-loading oil from the storage vessel).

Figure 2:
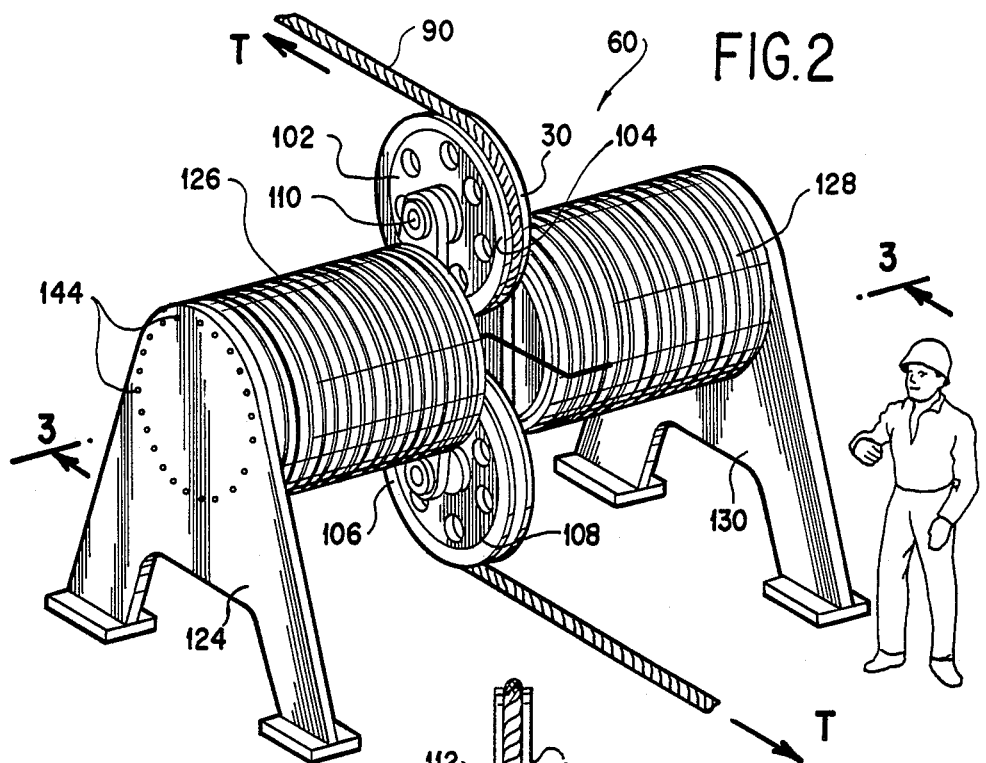
FIG. 2 is an isometric view of the damper device of FIG. 1 together with a portion of the rope associated therewith.
Figure 3:
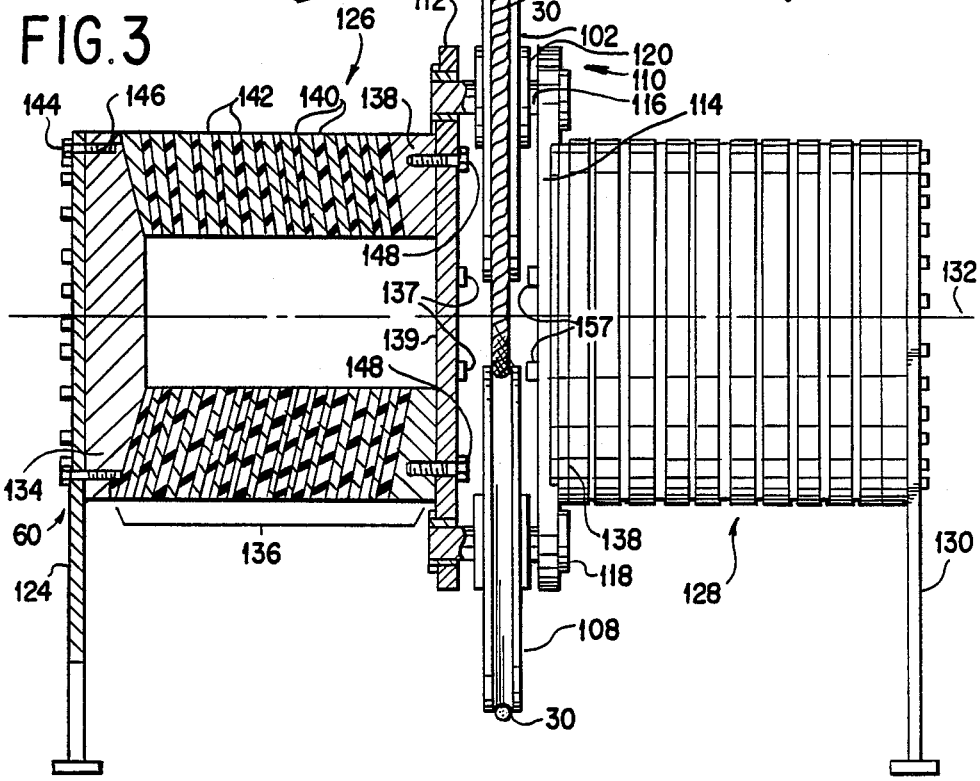
FIG. 3 is a side elevational view partially in cross section of the damper device of FIG. 2.

Reference should now be made to FIGS. 2 and 3 which are respectively isometric and side-elevational views of the damper (60) shown in FIG. 1. The rope (30) is guided by an upper sheave (102) from its generally horizontal orientation extending between the winch (40) and the tension device (60) over the front portion (104) of the upper sheave (102), to the rear portion (106) of a lower sheave (108), then finally to the lower horizontal portion of the rope (30) as it extends from the tension device (60) towards the fairlead (70) (FIG. 1).

The upper sheave (102) and the lower sheave (108) are rotatably mounted at the respective upper and lower ends of a rotatable arm assembly (110). As shown in the Figures, the longitudinal orientation of the arm assembly (110) when at rest (zero tension in the cable) is more or less vertical and thus more or less perpendicular to the horizontal orientation of the respective incoming and exiting portions (90, 80) of the cable (30).

In the embodiment illustrated in FIGS. 2 and 3, the arm assembly (110) comprises a pair of spaced plates, namely, a left plate (112) and a right plate (114), connected to each other at their respective upper ends by means of an upper sheave pin (116) and at their respective lower ends by means of a lower sheave pin (118). The upper sheave (102) includes a hub bushing (120) to permit the upper sheave (102) to rotate coaxially about the upper pin (116), while the lower sheave (108) includes a similar hub bushing (122) so as to permit it to be similarly rotatably mounted about the lower pin (118).

Each of the two sheave pins (116,118) is fixedly secured to only one of the two side plates (114) comprising the arm assembly (110); its free end slides in and out of a bushing provided as part of the opposite plate (112). By this means, a certain amount of variation in the spacing between the left plate (112) and the right plate (114) may be accommodated.

The left arm plate (112) is connected to a left outer frame member (124) by means of a left elastomeric torsional spring (126). A right elastomeric torsional spring (128) similarly connects the right plate (114) to a right outer frame member (130). Referring specifically to FIG. 3, it may be seen that the left torsion spring (126) and the right torsion spring (128) are substantially identical to one another, each being in the shape of a cylinder and each being concentric about a common axis (132) which intersects the arm assembly (110) at approximately ninety degrees ($\frac{1}{2}\pi$ radians).

Referring now to the left elastomeric torsion spring (126) shown in cross section in FIG. 3, it will be seen that the torsion spring assembly comprises a relatively thick outer end plate (134), an intermediate portion (136) and an inner end plate (138) somewhat thinner than the outer end plate (134), an inner compression plate (139) and inner compression pins (137). The intermediate spring portion (136) is molded of an appropriate elastomeric material such as neoprene or other rubber-like material resistant to the effects of sunlight, salt water and other related adverse environmental conditions such as may be encountered in a maritime environment. The intermediate portion (136) also comprises a plurality of rigid reinforcing plates (140), each of which is thin and conically shaped and oriented generally perpendicular to the axis (132) about which the arm assembly (110) rotates. The elastomer portion (142) of the elastomeric springs (126, 128) is bonded to the reinforcing disks (140) and to the two end plates (134, 138) such that when the inner end plate (138) is rotated about the axis (132) and the outer end plate (134) is held stationary, a torsional shearing action is imparted to the elastomer material (142) which in turn generates a counter torque about the axis (132) in an amount that is substantially proportional to the magnitude of the rotation of the inner end (138) with respect to the outer end (134). To prevent sag under dead weight and axial movement in the spring the elastomeric spring is compressed inwardly from outer and inner end plates (134) and (138) respectively by tightening compression pins (137) which force compression plate (139) inward along the axis of the torsion spring.

The function of the reinforcing plates (142) is to impart anisotropic characteristics to the elastomeric spring and in particular, to stiffen the elastomer against unwanted flexing without reducing the torsion spring's ability to accommodate the winding and unwinding of one end relative to the other about the central axis (132) of the cylinder (136) (see also the discussion of FIG. 4 hereinafter) and to reduce the tendency to the spring to sag under dead weight as well as increase elastomer life under flexing or shearing movement and restrict axial movement in the rubber springs if the unit is subject to side forces resulting from the lines coming off the sheaves along a path which is not perpendicular to the spring axis. This is accomplished by orienting the reinforcing disk (140) parallel to the direction of the intended shear. It will also be appreciated that the reinforcing disk (140) has a further effect of minimizing the tendency of the elastomeric assembly to be subjected to changes in length or diameter in response to simple external compressive and tensile forces. Although it will be appreciated that when a torque couple is applied to the reinforced elastomeric assembly (136) to produce a shear in a direction perpendicular to the central axis (132), the individual reinforcing plate will have no appreciable effect thereon.

In the embodiment illustrates in FIGS. 2 and 3, each of the outer ends (134) is secured in position with respect to its corresponding outer frame member (134, 130) an arm adjusting comprising a plurality of fasteners (144). The fasteners (144) engage a corresponding plurality of bores (146) in the outer end plate (134). Since the fasteners (144) and the respective bores (146) are spaced at regular intervals (for examle, 15°) about a circumference of a circle, it will be appreciated that it will be possible to adjust the initial angular orientation of the arm assembly (110) and the two sheaves (102, 108) with respect to the orientation of the rope as it exits (80) and enters (90) the tension device (60) by selecting which particular fastener (144) is to be inserted into which particular bore (146). The minimum increment of such an adjustment will be determined by the angular spacing between adjacent fasteners (144); however, if a finer adjustment is required, it will be evident to a skilled artisan that such a need may be accommodated by providing an additional adjustment means to reduce the amount of a single increment.

A plurality of bolts (148) are provided to clamp the respective left and right plates (112, 114) forming the arm assembly (110) to the respective inner end plates (138) of the respective left and right elastomeric torsion spring assemblies (126, 128). In the embodiment illustrated, the respective surfaces of inner end plates (138) facing the arm assembly (110) are provided with a suitable groove into which the respective arm plate (112, 114) is partially countersunk, thereby preventing any rotational slippage between the end plate (138) and its respective arm plate (112,114). Accordingly, the individual bolts (148) which (138) to their respective arm plates (112, 114) are not exposed to excessive side shear as a result of the torque transmitted from the elastomeric springs (126, 128) to the arm assembly (110) and vice versa. In the embodiment illustrated there is further provided the capability of adjusting the height of the arm assembly (110) relative to the elastomeric springs (126, 128) and the outer frames (124, 130) merely by loosening the arm securing bolts (148) and sliding the arm (110) along the aforementioned grooves in the inner end plate (138) to the desired position, whereupon the bolts (148) may be again tightened. In that regard, it will normally be preferable to center the arm assembly (110) with respect to the central axis (132) of the cylindrical torsion element (136) and to orient the winch (40) and the fairlead (70) (see FIG. 1) relative to the entering and exiting portions (90, 80) of the cable (30) in symmetric fashion such that only a pure torque couple is applied to the elastomeric springs (126, 128) and they are not subjected to excessive translational forces.

The torque generated by an elastomeric torsion element may be expressed by the equation $$M = a\ G\ I_p/L$$

where a equals the angular displacement of one end plate relative to the other in radians; G equals the shear modulus of the elastomeric material in kilograms per square meter (Kg/m); $I_p$ is the polar moment of inertia in quadratic meters ($m_4$) and L is the length of the elastomer in its axial direction expressed in meters (m). (For a solid cylinder, the polar moment of inertia $I_p$ will be equal to $\frac{1}{2}\pi R^4$, where R is the radius of the cylinder in meters).

Since one degree equals 0.01745 radian and a typical shear modulus is 225 psi (about $1.6 \times 10^5$ Kg/m²), it therefore may be calculated that a pair of elastomeric cylinders such as have been shown in FIGS. 2 and 3 having a radius of 24 inches (approximately 0.61 meters) and a length of 46 inches (approximately 1.17 meters) will produce a combined counter-torque of approximately 520 meter-kilograms per degree of rotation.

Figure 4A:
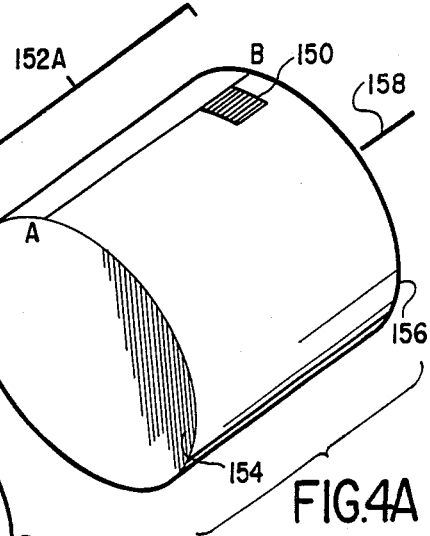
FIGS. 4A and 4B are a pair of isometric diagrams of a cylinder of elastomeric material showing the geometric relationship between the shear and the torsion before and after the cylinder has been subjected to a torsional shear.
Figure 4B:
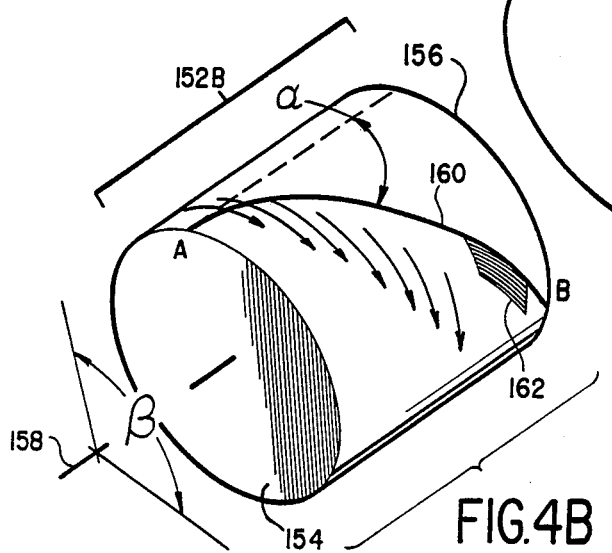

Referring now to FIGS. 4A and 4B, which it will be recalled are intended to show the geometric relationship between the shear and the torsion, it will be seen that a square element (150) may be defined on the outer circumference of an elastomeric cylinder prior to the application of any torsional shear (152A) such that the square will lie against a straight line A-B connecting points A and B respectively on the outer and inner ends (154, 156) of the cylinder (152) and parallel to the axis (158) of the cylinder. However, when one end (154) is rotated with respect to the other end (156) by an angle $\alpha$ (cylinder 152B) such that the line connecting point A with point B is no longer a straight line parallel to the axis (158) but rather is a helical spiral (160), then the square element (150) will be distorted (sheared by the angle $\alpha$) into a rhombus (162) whose respective vertices will be $(\frac{1}{2}\pi - \alpha)$ and $(\frac{1}{2}\pi + \alpha)$. For a typical elastomer material, the maximum shear angle through which it may be subjected without any loss of its elastic properties may be conservatively limited to be 45 degrees ($\frac{1}{4}\pi$ radians). Using the above-stated typical values (L equals 1.17 meters, R equals 0.61 meters), it may be calculated that the corresponding maximum rotation $\beta$ of the one end plate (134) with respect to the other (138) will be approximately 1.9 radians (109 degrees).

Figure 5:
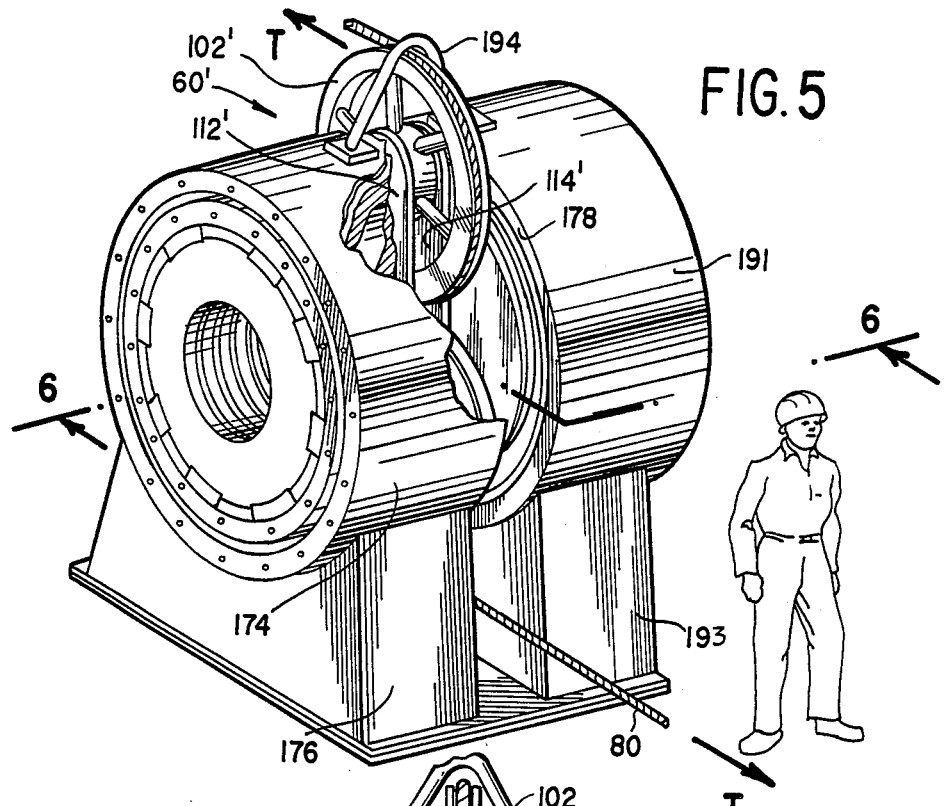
FIG. 5 is an isometric view of a second embodiment of a rope tension damper device constructed in accordance with the present invention wherein the elastomeric torsion elements are nested thereby resulting in a more compact unit.
Figure 6:
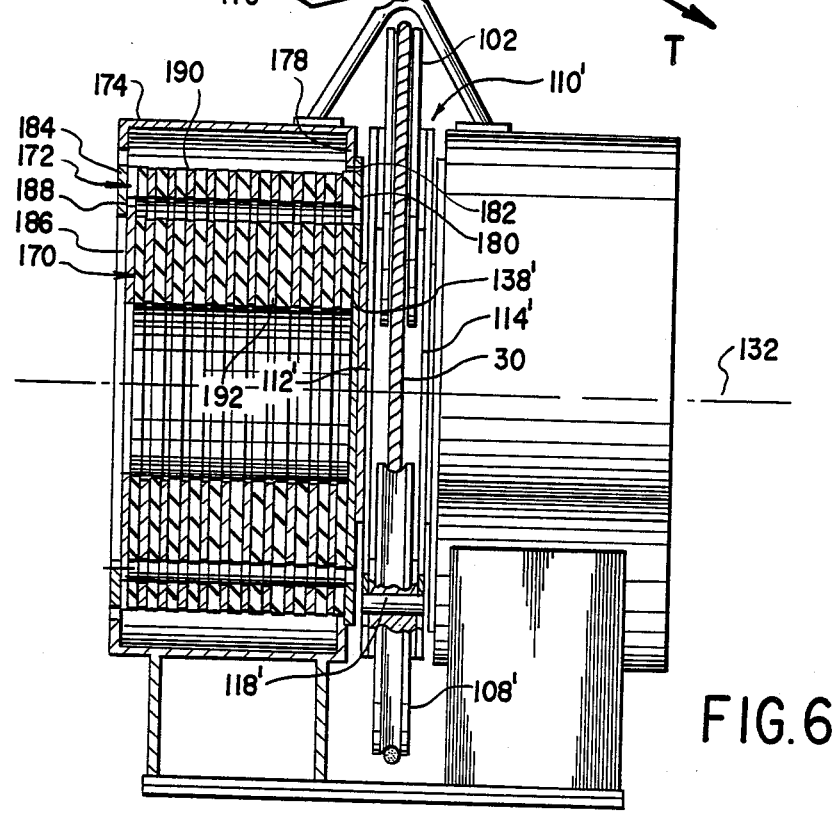
FIG. 6 is a side elevational view partially in cross section of the embodiment of FIG. 5.

Reference should now be made to FIGS. 5 and 6 of the drawings, which it will be recalled illustrate another embodiment of the invention wherein a more compact unit than that shown in FIG. 1 is provided as a result of the elastomeric torsion elements being nested.

From the above discussion of FIG. 4, it will be recalled that conservative design practice makes it desirable that no portion of the elastomer be subject to a shear strain greater than 45 degrees. Accordingly, in the embodiment of FIGS. 2 and 3, if the arm assembly (110) is to be provided with the capability of deviating 109 degrees in either direction from its rest position, it is necessary for the diameter of the cylinder to be approximately equal to its length. Furthermore, from the above-stated formula for the torque generated by an elastomeric element as it is twisted about an axis, it will be noted that the torque is a function of the polar moment of inertia about that axis. Accordingly, the interior of the cylinder makes a relatively small contribution to the total torque. Taking both the above factors into account, it may be readily appreciated that by nesting two hollow elastomeric cylinders, one within the other, with a first end of the outer cylinder being fixedly connected to a first end of the inner cylinder, the torque generated by the inner elastomeric cylinder and the torque generated by the outer elastomeric cylinder will be combined in such a way that only a portion of the rotation of the arm assembly (110) relative to the outer frame need be accommodated by each of the two nested cylinders. The embodiment shown in FIGS. 5 and 6 take advantage of these considerations. In these Figures, the various reference numbers previously utilized with respect to the embodiment of FIGS. 1 and 2 have been retained but the prime symbol (') has been appended to distinguish otherwise similar elements of the two embodiments. (A similar convention will be applied to the embodiment of FIGS. 7 and 8 using the double prime symbol (")).

Referring now specifically to FIGS. 5 and 6, with FIG. 5 being an isometric view (partially broken away to better show the arm assembly (110)) and FIG. 6 being a side elevational view partially in cross section as indicated by the line 6—6 in FIG. 5, it will be seen that this embodiment is much more compact in the direction of the longitudinal axis (132'), although for a given set of operational parameters, its overall height is determined by the vertical displacement between entering cable portion (90) and exiting cable portion (80) and thus will be substantially identical to the corresponding vertical dimensions of the previously described embodiment. The function of the solid cylindrical elastomeric torsional element (126) (FIGS. 2 and 3) is now performed by a nested pair of hollow torsional elements, namely, an inner hollow cylindrical element (170) and an outer hollow cylindrical element (172). An outer tubular shell (174) rigidly mounted to a hollow base (176) functionally corresponds to the left outer frame (124) of the previous embodiment.

From the cross sectional view of FIG. 6, it can be seen that an inwardly protruding annular rim (178) is fastened to an inboard annular end plate (180) of the outer elastomeric element (172) by means of an appropriate mechanical fastener (182). Although symbolized in the drawings by a bolt (182), it should be appreciated that other fastening means such as welding and/or riveting may also be employed to provide the required relatively rigid connection between the outer shell (174) and the inboard end plate (180). The outboard end of outer elastomeric element (172) is terminated by an outer annular end plate (184) which is rigidly fastened by a plurality of bolts (or other appropriate fastening means) (186) to the outboard annular end plate (188) of the inner elastomeric element (170). The inboard end of the inner elastomeric element (170) is terminated by an inboard end plate (138') to which is anchored the left arm (112') of the rotatable arm assembly (110'). From the Figure it may also be seen that the radial thickness of the inner hollow cylinder (170) is somewhat greater than that of the outer hollow cylinder (172). As noted previously, the torque produced by such an elastomeric element for a given torsional twisting about its longitudinal axis is a linear function of the polar moment of inertia and in fact increases as the fourth power of the radius. Since the outer torsional element (172) should share the torque and rotational movement of the arm assembly (110) in an equal fashion with the inner torsional element (170), it accordingly should have about the same stiffness as, and thus should be somewhat thinner than, the inner element. Both the inner and outer elastomeric elements (170, 172) employ the same reinforced integrally molded structure as that of the elastomeric element (136) shown in FIG. 3 and in particular are preferably molded of a rubber-like material capable of withstanding the adverse effects of the maritime environment (such as neoprene), the rubber being reinforced by a plurality of plates of a suitable reinforcing material such as stainless steel, aluminum, or Kevlar embedded in the elastomer during the molding process and oriented perpendicular to the device's main axis of rotation (132'). However, the individual reinforcing elements are not disk-shaped but rather are in the respective shapes of outer annuluses (190) and inner annuluses (192). (In that regard, it may be observed that the embodiment of FIG. 2 and FIG. 3 may optionally be modified by the substitution of a annulus-shaped reinforcing element for the disk-shaped element (140) shown in the Figure, since the reinforcing function of the disk (140) is required more towards the periphery of the cylinder than in its middle).

It will be appreciated that the right-hand elastomeric spring of the second embodiment (60') inside the right-hand tubular shell (190) and supported by the right-hand base (193) is the mirror image of the corresponding structure discussed previously with respect to the left-hand portion of the device. In order to provide additional rigidity, an upper connection link (194) may be advantageously provided to connect the corresponding upper portions of the left-hand tubular shell (174) and the right-hand tubular shell (191). Such a linking member (194) will also provide a means whereby the entire device (60') may be conveniently hoisted and will serve as a guide to maintain the cable entering portion (90) in its proper relationship with respect to upper sheave (102') when the arm assembly (110') is in its at-rest position and there will accordingly be the possibility of slack in the cable (30).

Reference should now be made to FIGS. 7 and 8, which it will be recalled illustrate yet another possible embodiment of the present invention that is substantially different from the two previously described embodiments that utilize the elastomeric damping effect of a cylindrical body in which the torsional shearing is distributed along the axial (longitudinal) direction of the torsional element, with one end of the element being secured to a rotatable arm and the other end of the torsional element being attached to a fixed frame. By way of contrast, the embodiment shown in FIGS. 7 and 8 utilizes a different configuration of an elastomeric torsional element in the shape of a tapered disk in which the shearing strain is distributed radially from a hub portion adjacent the axis of the disk to a circumferential portion at its outer periphery, with a substantial tapering in the disk's thickness from its hub to its periphery whereby the shearing action will be essentially uniform throughout the elastomer. The former type of shearing may be thought of as "longitudinal torsional shear" while the latter may be termed "radiating torsional shear."

As in the previously described embodiment, an inner arm assembly (110") is provided with an upper sheave (102") and a lower sheave (108"), with each of the two sheaves respectively pivoted at opposite ends of the arm assembly by means of an upper pivot pin (116") and a lower pivot pin (118") such that the two sheaves (102", 108") will be free to rotate about their respective axes and parallel to a central axis (132") intersecting the arm assembly (110") in the region between the two sheaves.

A left tapered disk elastomeric element (200) is attached to the left plate (112") of the rotatable arm (110") such that an arm adjusting means is formed whereby the hub portion (202) of the elastomeric element (200) will rotate about the device's principal axis (132") in accordance with the rotation of the arm assembly (110"). The periphery portion (204) of the elastomeric unit (200) is clamped by means of an outer circumferential strap (208) secured by suitable bolts or other fastening means (210) to the corresponding left side frame (124"). In a similar fahsion, a substantially identical tapered disk elastomeric element (206) is provided at the right hand of the device with its hub portion fixed relative to the arm assembly's right-hand plate (114") and with its peripheral portion secured to the right hand frame member (130") by means of a second mounting strap (208). Referring in particular to the cross section view of the left side elastomeric element (200) visible at the left hand of FIG. 8, it will be noted that each of the elastomeric elements (200, 206) is provided with a plurality of tubular reinforcing elements (212), each concentric about the device's axis (132").

The operational characteristics of a rope tension device constructed in accordance with the present invention will now be discussed with particular reference to the geometric diagrams of FIGS. 9 through 14 and the graph of FIG. 15.

Figure 12:
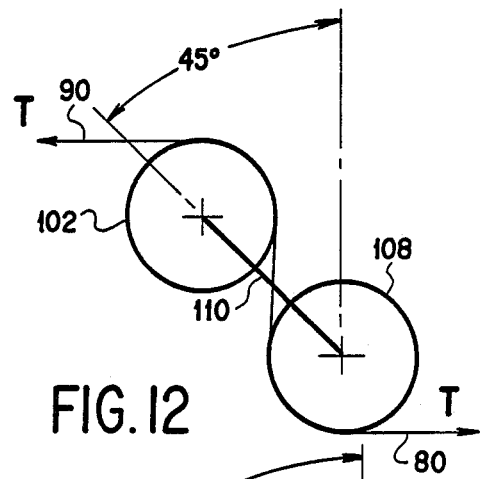
Figure 13:
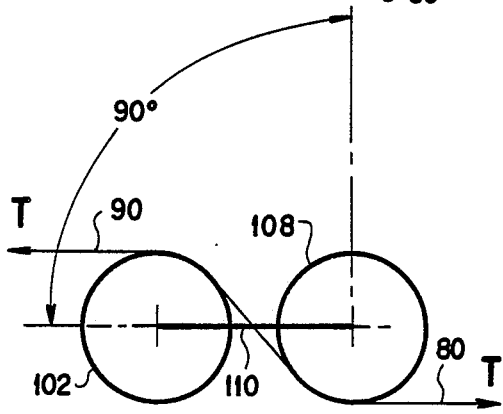
Figure 14:
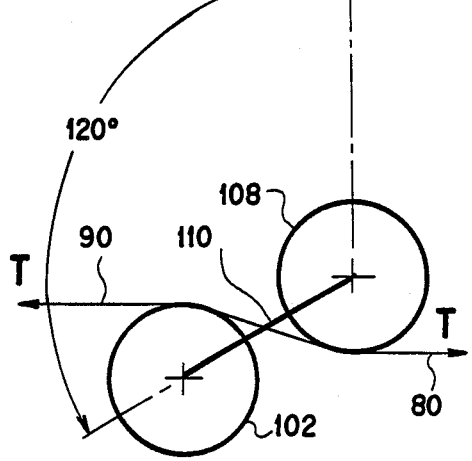

FIGS. 9 through 14 it will be recalled are intended to schematically show a typical rope tensioner device in accordance with the present invention (60, 60', or 60") with the angle between the arm (110, 110' 110") external orientation of the rope (80, 90) being rotated to respectively minus 30 degrees (FIG. 9), 0 degrees (FIG. 10), 15 degrees (FIG. 11), 45 degrees (FIG. 12), 90 degrees (FIG. 13) and 120 degrees (FIG. 14).

Figure 9:
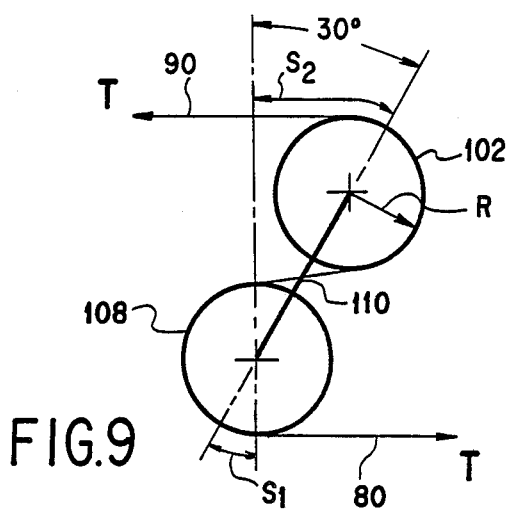
FIGS. 9 through 14 are geometric diagrams schematically showing a rope tension damper device in accordance with the present invention with the angle between the arm and the external orientation of the rope being respectively minus 30 degrees, 0 degrees, 15 degrees, 45 degrees, 90 degrees, and 120 degrees.

Referring now specifically to FIG. 9, it will be seen that the Figure represents symbolically the upper sheave (102), the lower sheave (108), the arm (110) and a portion of the rope (30) (including an upper portion (90) where it enters the device from the winch and a lower exiting portion (80) where it exits the device on its way to the fairlead (70)). Both the upper sheave (102) and the lower sheave (108) have the same respective radius "R" and are mounted apart from one another along the rotatable arm (110) at a fixed distance "A". Since entering portion (90) and exiting portion (80) of the cable (30) will be oriented more or less horizontally during the intended use of the device (see FIG. 1), it may be seen that the tension will apply a torque couple to the tension device whose magnitude is equal to the tension "T" times the vertical displacement "V" between the incoming and exiting portions of the cable. FIGS. 9 through 14 correspond to the rope tension device of the present invention in use with the arm (110) at various angles of inclination with respect to the vertical; however, in the general case, the tension force T is not necessarily applied to the device in the horizontal direction and the angle of interest will then be measured with respect to a line perpendicular to the orientation of the incoming rope portion (90) and the exiting rope portion (80) (or in the event that these portions are not parallel, then a line perpendicular to the bisector of the angle therebetween).

Figure 10:
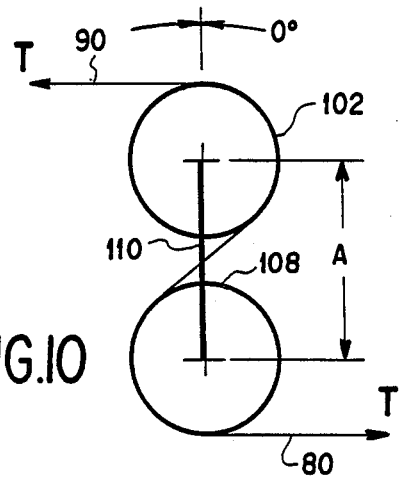

Referring now specifically to FIG. 9, which is intended to show the geometrical characteristics of the device when the arm is inclined backwards in an amount 30 degrees from the vertical, it will be seen that the vertical distance V is somewhat less than that shown in FIG. 10 when the arm (110) is oriented vertically. A simple geometric calculation will show that the vertical distance V in FIG. 10 is equal to $2R+A$ while in FIG. 9 it is equal to $2R+A \cos(30°)$. Furthermore, the effective length of the cable (30) will increase by an amount $S=S_1+S_2=2R\,\theta+A\sin(\theta)$ between the minus $\theta$ radian position shown in FIG. 9 and the 0 position shown in FIG. 10 (or between 0 and plus $\theta$ radian).

Figure 11:
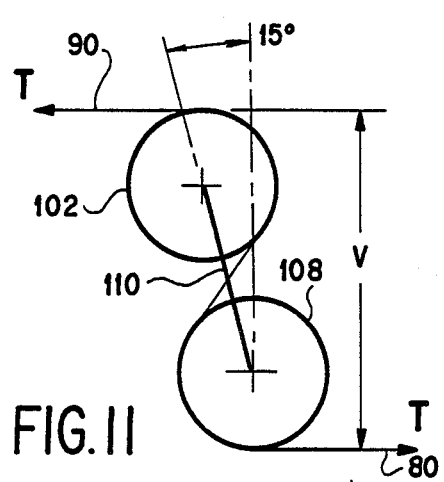

Referring now to FIG. 11, which shows the arm (110) now oriented at an angle of plus 15 degrees with respect to the vertical, it will be seen that the vertical displacement V is now equal to $2R+A \cos(15°)$ while the effective length of the cable (30) will have been further increased by an amount $(1/6)\pi R$.

The corresponding calculations for FIGS. 12 and 13, which show the arm (110) further rotated as a result of successive increases in the tension T will show that the corresponding vertical distance V will be respectively $A \cos(45°)+2R$ and $2R$ while the corresponding elongation S will be respectively $A \sin(45°)+\frac{1}{2}\pi R$ and $A+\pi R$.

Referring now to FIG. 14, it will be seen that the tension of the cable (30) has been increased to the point where the angle is increased to 120 degrees, a value which will normally be in excess of the normal operating range of the elastomeric torsion element which it will be recalled (at least with respect to the numerical examples given with respect to the embodiment of FIGS. 2 and 3) is designed with a normal maximum rotational deflection of 109 degrees. In any event, the vertical displacement V will be reduced to an amount equal to $2R-A \sin(30°)$ and the elongation S will be $(4/3)\pi R$.

Figure 15:
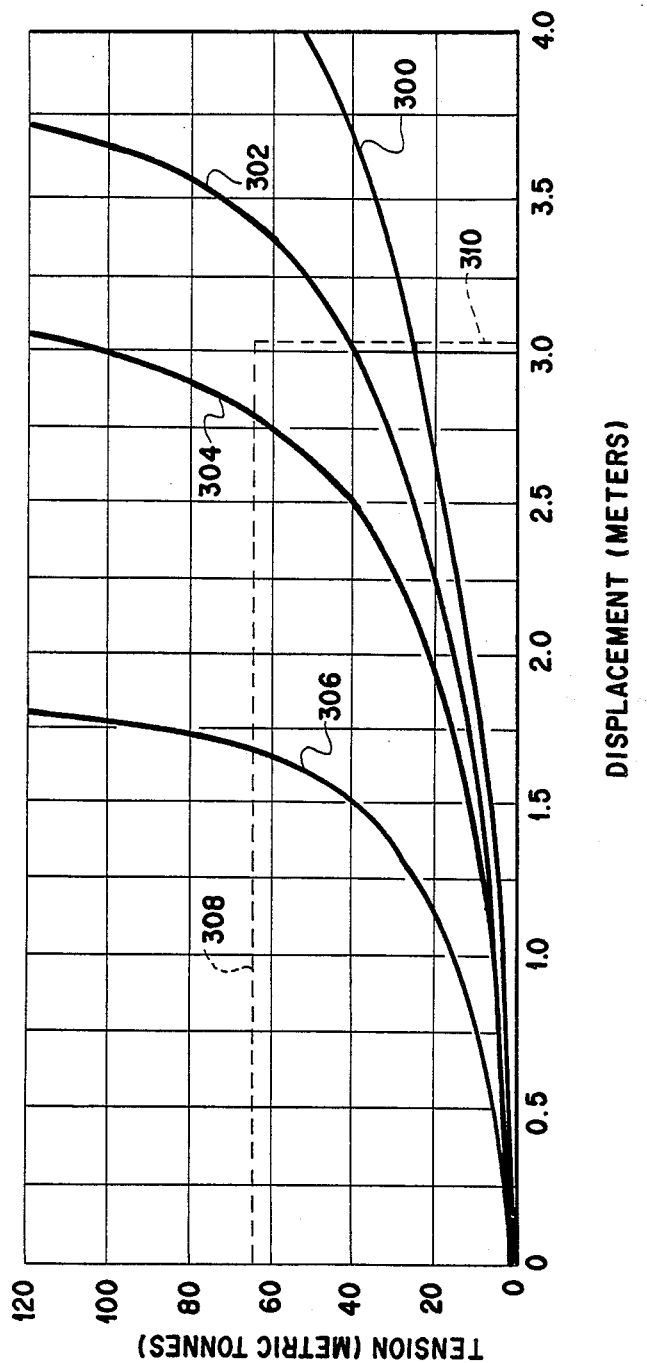
FIG. 15 is a set of graphs showing the relationship of the tension applied to the rope as a function of the displacement when the initial zero load orientation of the arm with respect to the rope is respectively 45 degrees, 15 degrees, 0 degrees, and minus 30 degrees.

Reference should now be made to FIG. 15, which is a graph showing the operational characteristics of a rope tension damper device utilizing an elastomeric torsional element subjected to longitudinal torsional shear with the four curves corresponding respectively to the operational characteristics of the device (60) when the arm (110) has been adjusted to an at-rest condition (that is to say, zero tension T in the cable (30)) with an initial inclination of respectively minus 30 degrees (lower curve (300)), 0 degrees (curve 302)), plus 15 degrees (curve (304)) and plus 45 degrees (curve (306)). These correspond respectively to the geometric configurations indicated diagrammatically in FIGS. 9, 10, 11 and 12. It will be seen accordingly the first curve (300) is almost linear and provides a displaement S of approximately 4 meters when a tension of approximately 50 metric tons is applied to the cable (30) (or conversely a tension T of approximately 50 tons will result in a displacement S of approximately 4 meters). The 0 degree curve (302), by way of contrast, starts to climb steeply when the displacement S is in excess of 3 meters and/or the tension T is in excess of 40 tons. The 15 degree curve (304) starts to climb steeply at an even lesser displacement S and/or tension T. The 45 degree curve (306) is even more extreme. The horizontal dotted line (308) corresponding to approximately 65 metric tons and the vertical dotted line (310) corresponding to slightly more than 3.0 meters indicate a typical set of design parameters. From the various graphs it may be seen that an initial orientation of arm (110) at an angle intermediate 0 degrees and plus 15 degrees will result in a smooth transition offering a noticeable increase in resistance as the design parameters are reached but will permit some additional displacement if the operational parameters are exceeded without resulting in an excessively high rate of increase in the tension T.

Although three different embodiments of a novel rope tension damper device have been described in detail, it should be apparent to the skilled artisan in light of the foregoing description that other variations and embodiments may be constructed that do not depart from the various inventive concepts which underlie the present invention. Accordingly, it is intended to embrace all such alternatives, modifications and variations as fall within the spirit and broad scope of the appended claims.

We claim:

1. In a vessel mooring system, the combination comprising:
   (a) an inelastic flexible line means for mooring said vessel having at least a proximate end and a distal end, said proximate end being connected to said vessel and said distal end being connected to a point independent of said vessel;
   (b) a frame;
   (c) a rotatable arm having a first rotational axis, said arm having a zero load rotational position, and said arm assuming said zero load rotational position when said arm is at rest during the normal course of operation of said combination;
   (d) an elastomeric torsion spring oriented about said first rotational axis of said arm for independently connecting said arm to said frame, said spring providing a counter-torque approximately proportional to the angular displacement of said arm from said zero load rotational position;
   (e) a first sheave rotatably mounted with respect to said arm having a second rotational axis parallel to and spaced from said first rotational axis of said arm and intersecting said arm at a first location;
   (f) a second sheave rotatably mounted to said arm at a second location spaced apart from said first location and having a third rotational axis parallel to and spaced from said first rotational axis of said arm; and
   (g) an arm adjustment means for adjusting the zero load rotational position of said arm with respect to said frame such that by appropriate initial adjustment of the orientation of said arm under zero loading it is possible to vary the rate at which the effective length of said inelastic flexible line means changes with respect to a predetermined increment of tension of said elastic flexible line means; whereby said inelastic flexible line means as it passes through said device may be guided by said first sheave and by said second sheave into a generally S-shaped configuration which is gradually distorted into a relatively straight configuration as the tension applied to said inelastic flexible line means is increased and said arm is thereby caused to rotate about said first rotational axis, so that as an increase in tension in said inelastic flexible line means rotates said arm and elongates the S-shaped configuration of said inelastic flexible line means a correspondingly lesser leverage is associated with the torque couple applied to said arm by the tension in said inelastic flexible line means.

2. The combination according to claim 1 wherein said inelastic flexible line means comprises a mooring rope.

3. The combination according to claim 1 wherein said inelastic flexible line means comprises a chain.

4. The combination according to claim 1 wherein said inelastic flexible line means comprises a cable.

5. The combination according to claim 1 wherein said frame is directly connected to said vessel.

* * * * *